(12) United States Patent
Kennedy

(10) Patent No.: US 6,285,567 B1
(45) Date of Patent: Sep. 4, 2001

(54) METHODS AND APPARATUS FOR UTILIZING THE TRANSFORMER LEAKAGE ENERGY IN A POWER SUPPLY

(75) Inventor: Dennis M. Kennedy, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/661,936

(22) Filed: Sep. 14, 2000

(51) Int. Cl.[7] .................................................. H02M 3/335
(52) U.S. Cl. ............................................................ 363/21.01
(58) Field of Search ........................... 363/21.02, 21.03, 363/21.01, 97, 131

(56) References Cited

U.S. PATENT DOCUMENTS

| | | | | |
|---|---|---|---|---|
| 4,788,634 | * | 11/1988 | Schlecht et al. | 363/48 |
| 5,608,613 | * | 3/1997 | Jansen | 363/97 |
| 6,069,801 | * | 5/2000 | Hodge, Jr. et al. | 363/21.02 |

* cited by examiner

*Primary Examiner*—Shawn Riley

(57) ABSTRACT

A method and apparatus for utilizing leakage energy from a transformer within a power supply, including in one embodiment, a transformer having a primary winding and a secondary winding in communication with a switch and a capacitor, a rectifier and a load within the power supply.

22 Claims, 3 Drawing Sheets

METHODS AND APPARATUS FOR UTILIZING THE TRANSFORMER LEAKAGE ENERGY IN A POWER SUPPLY

FIELD OF THE INVENTION

The present invention generally relates to power supplies and, more particularly, to methods and apparatus for utilizing the transformer leakage energy in a power supply.

BACKGROUND OF THE INVENTION

DC switching power supplies are vital components of electronic circuits. They are powered by a supply voltage and provide output voltages at various levels to power the electronic circuits. To produce these various output voltage levels, DC switching power supplies include DC-to-DC converters containing transformers. The primary and secondary windings of the transformer are not perfectly coupled to each other or to the magnetic material within the transformer. This imperfect coupling results in leakage energy in the magnetic characteristics of the transformer that builds up over time and is stored within the transformer. Subsequently, the stored leakage energy causes the transformer to operate as if inductors are connected in series with the windings, with the inductors storing the leakage energy. This is known as leakage inductance. Unless dissipated, the stored leakage energy will negatively impact the performance of the power supply. If the leakage energy is not dissipated, it may result in voltages and/or currents above the design specifications of the power supply components resulting in damage to the components or unsafe operating conditions.

To prevent the build up of the leakage energy, power supplies typically either dissipate the leakage energy in a resistor, or feed the leakage energy back to the DC input voltage source at the input to the transformer. The leakage energy is fed back by using a separate winding coupled to the primary winding of the transformer. The first approach is wasteful because the energy is dissipated. The second approach results in additional leakage energy from the separate winding that builds up if not dissipated. Also, power supplies typically contain circuitry that requires power from voltages higher than the DC input voltage source. In addition, power supplies typically have hold-up capacitors charged to a higher voltage than the DC input voltage source. These hold-up capacitors provide energy to the power supply circuitry during a momentary loss in the DC input voltage source. Obtaining these higher voltages requires additional circuitry such as additional transformer windings or additional DC-to-DC converter circuitry. Such additional circuitry is complicated, consumes space, adds weight, increases the cost of the power supply, and results in an inefficient use of power.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

A method and apparatus for utilizing leakage energy from a transformer, including in one embodiment, a transformer having a primary winding and a secondary winding in communication with a switch and a capacitor, a rectifier and a functional load. In operation, any leakage energy from the transformer is communicated to the functional load, thereby preventing wasteful dissipation of the energy.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The ensuing description is a preferred exemplary embodiment only, and is not intended to limit the scope, applicability, or configuration of the invention in any way. Rather, the ensuing descriptions provide a convenient description for implementing certain embodiments of the invention, it being understood that various changes may be made in the function and arrangement of elements described in an exemplary preferred embodiment without departing from the spirit and scope of the invention as set forth in the appended claims.

Figure 1:
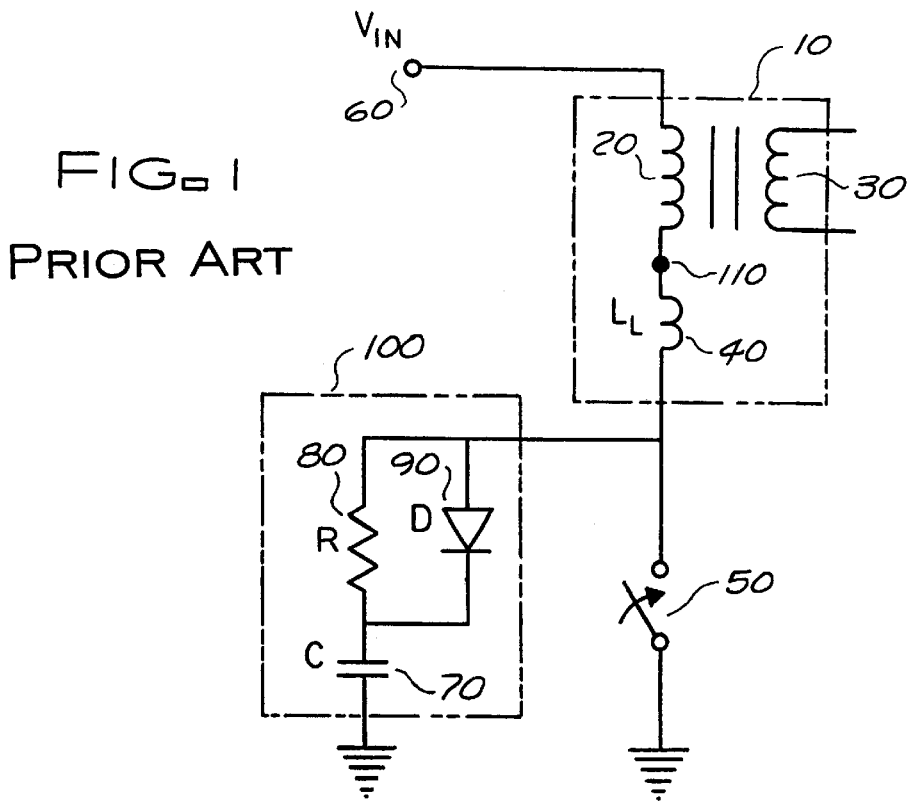
FIG. 1 is an illustration of a prior art circuit for dissipating the transformer leakage energy in a DC switching power supply.

FIG. 1 is an illustration of a prior art circuit for dissipating the transformer 10 leakage energy in a DC switching power supply. The transformer 10 has a primary winding 20 magnetically coupled to a secondary winding 30. Because of imperfect coupling, leakage energy exists within the transformer 10 and is represented by the leakage inductance 40. The switch 50 chops the DC input voltage source (VIN) 60, thus, establishing an alternating voltage at the input to the transformer 10. Typically, the switch 50 is implemented with a transistor or a field effect transistor. The capacitor 70, the resistor 80, and the rectifier 90 form a snubber circuit 100. The snubber circuit 100 dissipates the leakage energy from the transformer 10 in the resistor 80. Thus, by not utilizing the leakage energy for any useful purpose, the leakage energy is wasted by dissipation. The prior art circuit of FIG. 1 operates as follows.

When the switch 50 is initially opened, the current through the switch 50 falls to zero. During that time, the peak current in the leakage inductance 40, $I_p$, remains approximately constant. The current divides between the switch 50 and the capacitor 70. The portion no longer flowing in the switch 50 flows through the rectifier 90 into the capacitor 70. Thus, the voltage across the capacitor 70 builds up parabolically over time. At a later time, the voltage at the transformer internal node 110 reaches approximately $2V_{IN}$ which is the reset requirement of the transformer 10. At that time, the secondary winding 30 begins to conduct current. Thereafter, transformer internal node 110 is clamped to approximately $2V_{IN}$. The current in the leakage inductance 40 (still $I_p$) flows solely into the capacitor 70, continuing to charge the capacitor 70 linearly with time. Eventually, the current in the leakage inductance 40 decreases to zero, so that the stored energy in the leakage inductance 40 is now zero. The rectifier 90 stops conducting and the charging of the capacitor 70 ceases because capacitor 70 has attained its maximum voltage. Thus, capacitor 70 has completed storing the leakage energy that formerly was stored in the leakage inductance 40. The increase in the capacitor 70 voltage is calculated by equating the energy delivered by the leakage inductance 40 and the energy received by the capacitor 70.

$$\tfrac{1}{2}C(\Delta V_c)^2 = \tfrac{1}{2}L_L I_p^2$$

where $L_L$ is the leakage inductance 40, $I_p$ is the current in the leakage inductance 40, and C is the capacitance of the capacitor 70. Solving for $\Delta V_c$, $$\Delta Vc = I_p (L_L/C)^{1/2}$$

Thus, the maximum voltage on the capacitor 70 is approximately its former value of $2V_{IN}$ plus $\Delta Vc$. Next, the capacitor 70 discharges through the resistor 80 to the voltage of approximately $2V_{IN}$ and remains at that voltage until the next time the switch 50 is closed. At that time, the capacitor 70 is discharged through the resistor 80 and the switch 50. Thereafter, the cycle repeats as described above. Thus, the leakage energy stored in the leakage inductance 40 is transferred to the capacitor 70 and then dissipated through resistor 80. Therefore, the energy is not utilized in a useful way but instead is wasted in the dissipating resistor 80.

Figure 2:
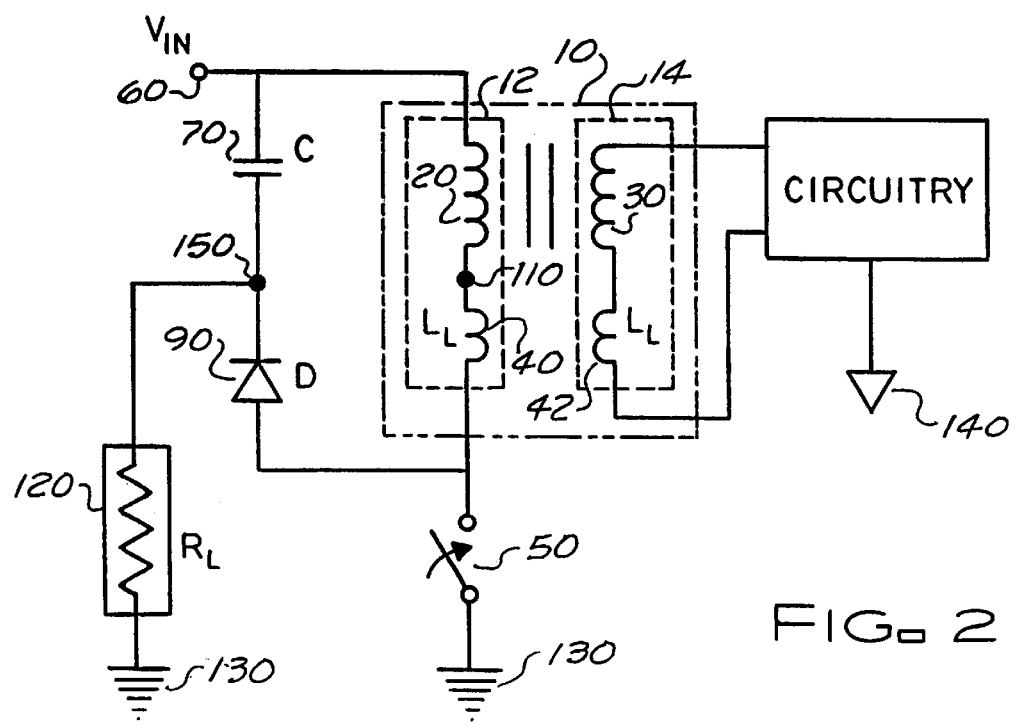
FIG. 2 is an illustration of one embodiment of the present invention for utilizing the transformer leakage energy on the primary side of the transformer in a DC switching power supply.

FIG. 2 is an illustration of one embodiment of the present invention for utilizing the transformer leakage energy on the primary side 12 of the transformer 10 in a DC switching power supply. The transformer 10 has a primary side 12 and a secondary side 14. The primary side 12 has a primary winding 20 magnetically coupled to a secondary winding 30 on the secondary side 14. Because of imperfect coupling, leakage energy exists within the transformer 10 and is represented by the leakage inductance 40 on the primary side 12 and the leakage inductance 42 on the secondary side 14. The switch 50 chops the DC input voltage source ($V_{IN}$) 60, thus establishing an alternating voltage at the input to the transformer 10. Typically, the switch 50 is implemented with one or more transistors and associated circuitry. The parasitic capacitance of the switch 50 limits the rate of change of the voltage across the switch 50 as the switch 50 is opened.

The capacitor 70 and the rectifier 90 are connected in series across the primary winding 20 and the leakage inductance 40. In a preferred embodiment, the capacitor 70 and the rectifier 90 are physically located close to the transformer 10. A functional load 120 is connected between the cathode of the rectifier 90 and the primary reference point 130. Preferably, functional load 120 includes functional circuitry within the power supply. The capacitor 70, and the rectifier 90 function to establish an average energy source 150 at the cathode of the rectifier 90. The average energy source provides power to the functional load 120. Thus, the leakage energy is utilized by the functional load 120. The circuit of FIG. 2 operates as follows.

When the switch 50 is initially opened, the current through the switch 50 begins to fall toward zero. During that time, the peak current in the leakage inductance 40, $I_p$, remains approximately constant. The current divides between the switch 50 and the rectifier 90. Most of the current in the rectifier 90 flows into the capacitor 70, with a small portion of the current flowing into the functional load 120. Thus, the voltage across the capacitor 70 builds up parabolically with time.

At a later time, the voltage at the transformer internal node 110 reaches approximately $2V_{IN}$ which is the reset requirement of the transformer 10. At that time, the secondary winding 30 begins to conduct current. Thereafter, transformer internal node 110 is clamped to approximately $2V_{IN}$. The current in the leakage inductance 40 (still $I_p$) flows solely into the rectifier 90, continuing to charge the capacitor 70 linearly with time, with a small portion of the current flowing into the functional load 120. Eventually, the current in the leakage inductance 40 decreases to zero, so the stored energy in the leakage inductance 40 is now zero. The rectifier 90 stops conducting, the charging of the capacitor 70 ceases, and the capacitor 70 has attained its maximum voltage. Thus, the capacitor 70 has completed storing the leakage energy that formerly had been stored in the leakage inductance 40. The increase in the capacitor 70 voltage is calculated by equating the energy delivered by the leakage inductance 40 and the energy received by the capacitor 70.

$$\tfrac{1}{2}C(\Delta Vc)^2 = \tfrac{1}{2}L_L I_p^2 \tag{1}$$

where $L_L$ is the leakage inductance 40, $I_p$ is the current in the leakage inductance 40, and C is the capacitance of the capacitor 70. Solving for $\Delta Vc$, $$\Delta Vc = I_p (L_L/C)^{1/2} \tag{2}$$

Thus, the maximum voltage on the capacitor 70 is its former value of approximately $2V_{IN}$ plus $\Delta Vc$. Thus, the charged capacitor 70 establishes an average energy source 150 at a voltage greater than twice the DC input voltage source 60 for use by the functional load 120.

Next, the switch 50 closes, causing current to flow through the primary side 12 of the transformer 10 and through the switch 50. The rectifier 90 is reverse-biased and thus, prevents current from flowing into the capacitor 70. Thereafter, the cycle repeats as described above.

From the time that the switch 50 is open and the current in the leakage inductance 40 has decreased to zero until the time that the switch 50 is closed, and continuing on for the entire duration that the switch 50 is closed, the average energy source 150 provides energy to the functional load 120. The voltage at the average energy source 150 must remain approximately above $2V_{IN}$ to keep the transformer 10 reset. Since the voltage on the capacitor 70 is $2V_{IN}$ plus $\Delta Vc$, where $\Delta Vc$ corresponds to the voltage increase from the leakage energy, the functional load 120 should deplete only the leakage energy from the capacitor 70, leaving the capacitor voltage above $2V_{IN}$. The power from the leakage energy is represented as $$P_{LE}=\tfrac{1}{2}L_L I_P^2 F \qquad (3)$$

where $L_L$ is the leakage inductance 40, $I_p$ is the current in the leakage inductance 40, and F is the switching frequency of the switch 50. The power into the functional load 120 is represented as $$P_{FL}=V^2/R_L \qquad (4)$$

where $R_L$ is the functional load 120, and V is the voltage of the average energy source 150.

Equating the power from the leakage energy to the power into the functional load 120, $$V^2/R_L=\tfrac{1}{2}L_L I_P^2 F \qquad (5)$$

Solving for V, $$V=(\tfrac{1}{2}L_L I_P^2 R_L F)^{\tfrac{1}{2}} \qquad (6)$$

Thus, the voltage at the average energy source V 150, is a function of the leakage inductance 40, $L_L$, the current, $I_L$, in the leakage inductance 40, the functional load 120, $R_L$, and the frequency F of the switch 50 For a given transformer 10, the leakage inductance 40, $L_L$, and the current $I_L$ in the leakage inductance 40 are fixed. Therefore, for a given switching frequency F of the switch 50, the value of the functional load 120, $R_L$, determines V, the voltage at the average energy source 150. Thus, RL, the value of the functional load 120, is chosen to ensure that the voltage at the average energy source 150 remains above $2V_{IN}$.

The functional load 120 may be any circuitry in the power supply that requires energy from a voltage source higher than the DC input voltage source 60. For example, the functional load 120 may be one or more hold-up capacitors receiving the energy from the average energy source 150 and charging up to a voltage greater than twice the DC input voltage source 60.

In addition, the power supply may contain multiple DC-to-DC converters, and thus, multiple transformers 10. Each transformer 10 may be equipped with the circuitry of FIG. 2 with an average energy source 150 for each transformer 10 circuit. The resulting multiple average energy sources 150 may be wire-ORed together to form a single average energy source 150.

Equation (6) also exhibits that V, the voltage at the average energy source 150, is a function of the square root of the leakage inductance 40, $L_L$. Since the leakage inductance 40 varies amongst transformers 10, the voltage at the average energy source 150 varies depending upon the particular transformer 10 used. However, the square root relationship between V and $L_L$ ensures that the voltage variance at the average energy source 150 is in an acceptable range. For example, if the ratio of leakage inductances 40 between two transformers 10 is 1.5:1, or in other words, a 50% change in leakage inductance 40, the ratio of voltages at the average energy source 150 is 1.22:1, or a 20% change in voltage.

Figure 3:
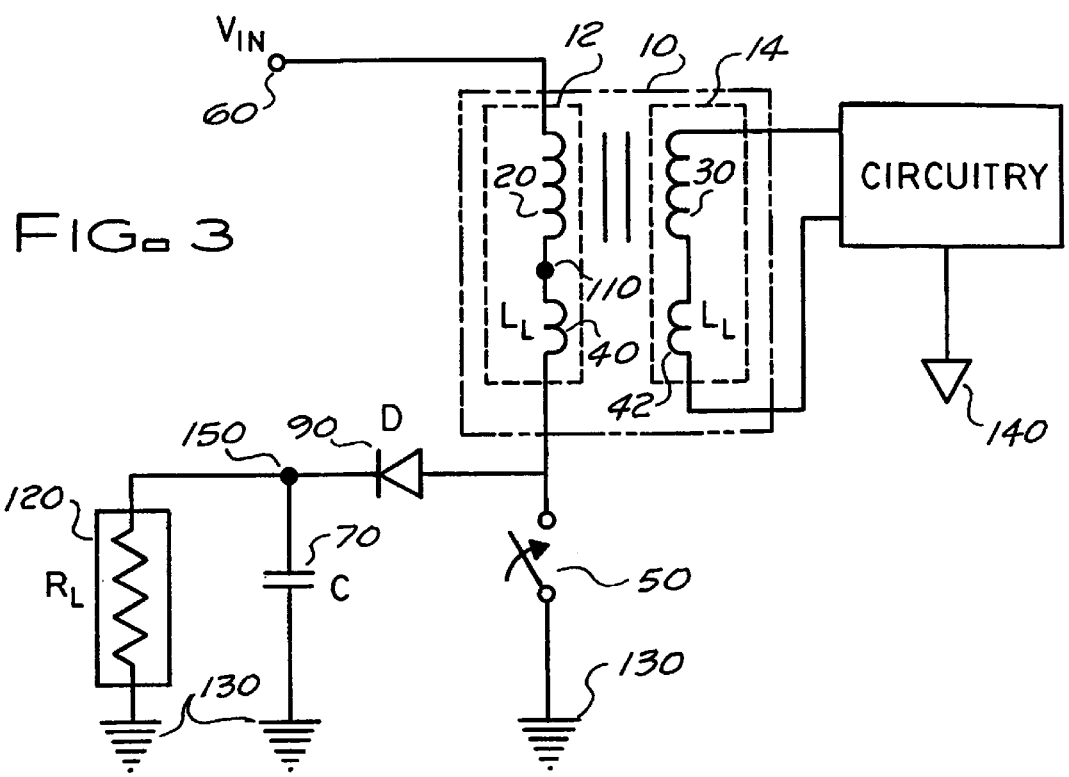
FIG. 3 is an illustration of an alternate embodiment of the present invention for utilizing the transformer leakage energy on the primary side of the transformer in a DC switching power supply.

FIG. 3 is an illustration of an alternate embodiment of the present invention for utilizing the transformer leakage energy on the primary side 12 of the transformer 10 in a DC switching power supply. The capacitor 70 and the rectifier 90 are connected in series across the switch 50. In one embodiment, the capacitor 70 and the rectifier 90 are physically located close to the transformer 10. The functional load 120 is connected between the cathode of the rectifier 90 and the primary reference point 130. The capacitor 70, and the rectifier 90 function to establish an average energy source 150 at the cathode of the rectifier 90. The average energy source provides power to the functional load 120. Thus, the leakage energy is utilized by the functional load 120. The circuit of FIG. 3 operates in the same manner as the circuit of FIG. 2. Because the capacitor 70 in FIG. 3 is connected between the rectifier 90 and the primary reference point 130, the capacitor 70 has a larger voltage drop across it than the capacitor 70 in FIG. 2. Thus, the capacitor 70 in FIG. 3 must be able to withstand higher voltages than the capacitor 70 in FIG. 2.

Figure 4:
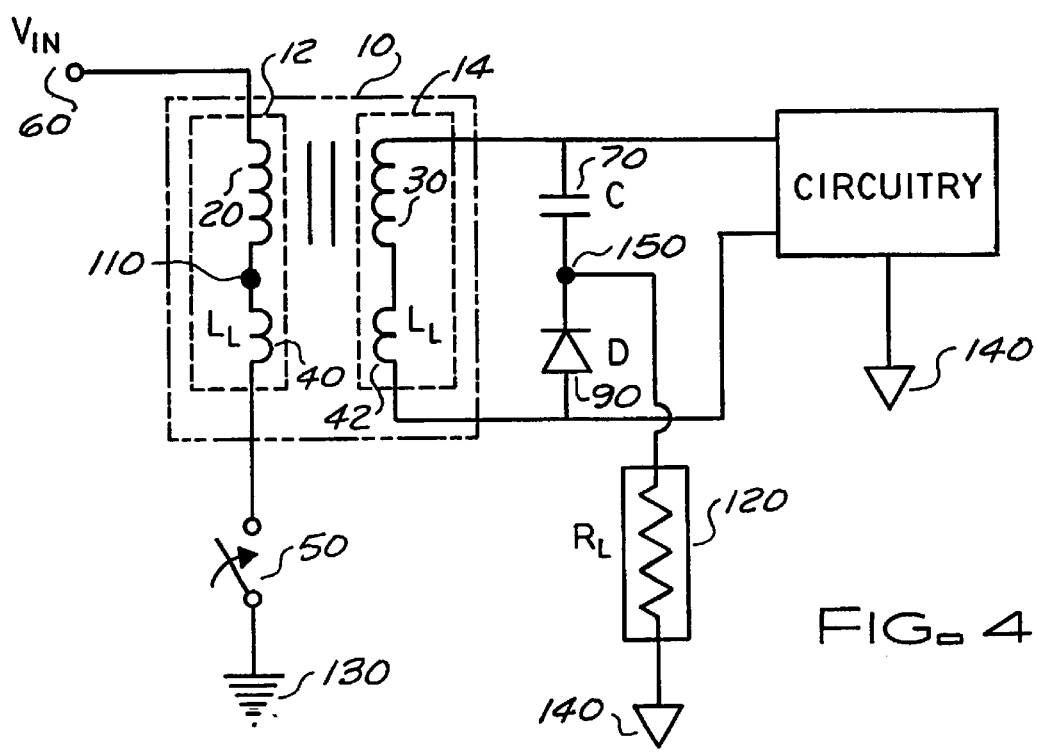
FIG. 4 is an illustration of another embodiment of the present invention for utilizing the transformer leakage energy on the secondary side of the transformer in a DC switching power supply.

FIG. 4 is an illustration of a preferred embodiment of the present invention for utilizing the transformer leakage energy on the secondary side 14 of the transformer 10 in a DC switching power supply. The capacitor 70 and the rectifier 90 are connected in series across the secondary winding 30 and the leakage inductance 42. In a preferred embodiment, the capacitor 70 and the rectifier 90 are physically located close to the transformer 10. The functional load 120 is connected between the cathode of the rectifier 90 and the primary reference point 130. The capacitor 70, and the rectifier 90 function to establish an average energy source 150 at the cathode of the rectifier 90. The average energy source provides power to the functional load 120. Thus, the leakage energy is utilized by the functional load 120. In operation, the circuit of FIG. 4 operates to allow leakage energy in the secondary leakage inductance 42 to be captured by diode 90 and capacitor 70 for use by load $R_L$ 120.

Figure 5:
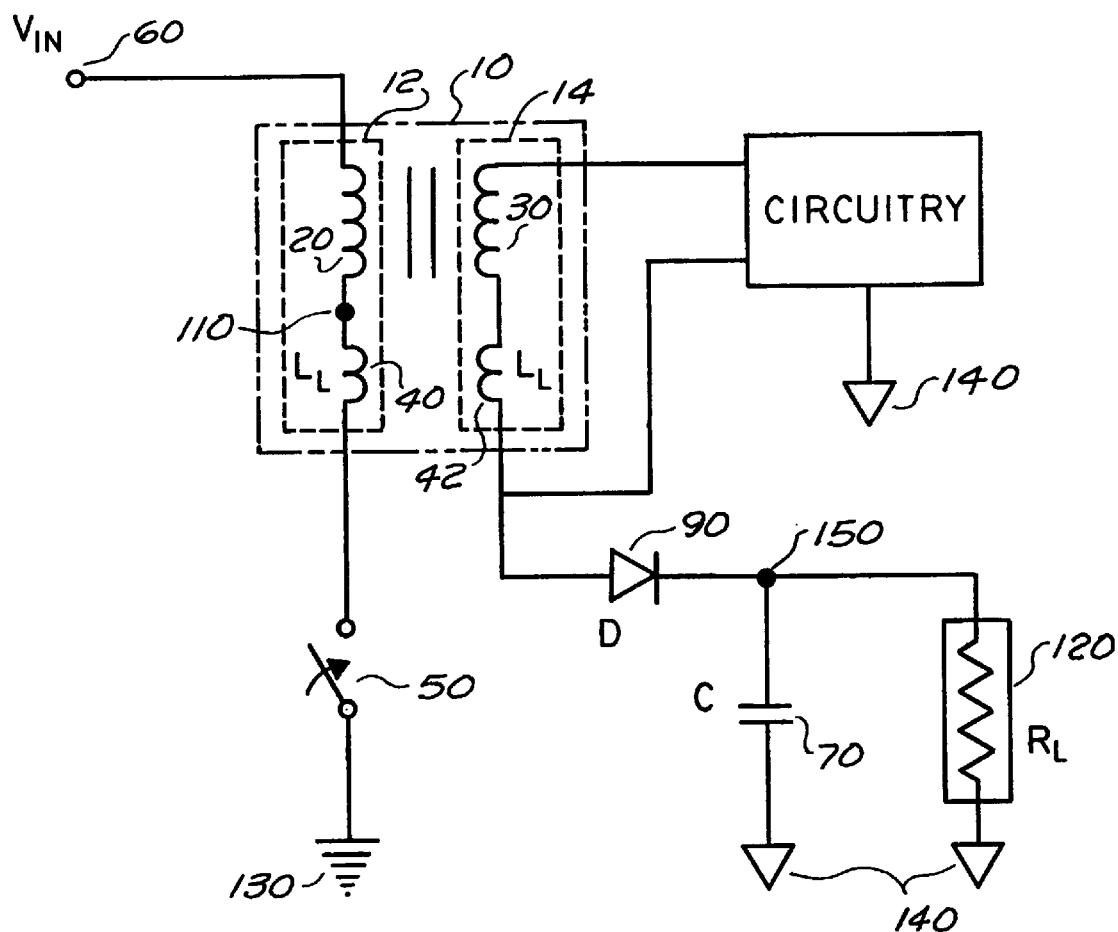
FIG. 5 is an illustration of an alternate embodiment of the present invention for utilizing the transformer leakage energy on the secondary side of the transformer in a DC switching power supply.

FIG. 5 is an illustration of an alternate embodiment of the present invention for utilizing the transformer leakage energy on the secondary side 14 of the transformer 10 in a DC switching power supply. The capacitor 70 and the rectifier 90 are connected in series between the leakage inductance 40 and the secondary reference point 140. In a preferred embodiment, the capacitor 70 and the rectifier 90 are physically located close to the transformer 10. The functional load 120 is connected between the cathode of the rectifier 90 and the primary reference point 130. The capacitor 70, and the rectifier 90 function to establish an average energy source 150 at the cathode of the rectifier 90. The average energy source provides power to the functional load 120. Thus, the leakage energy is utilized by the functional load 120. In operation, the circuit of FIG. 5 allows the leakage energy in the secondary leakage inductance $L_L$ 42 to be captured by diode 90 and capacitor 70 to be utilized by load $R_L$ 120.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of methods and apparatus for utilizing the transformer leakage energy in a power supply, is followed.

What is claimed is:

1. An apparatus for utilizing inductive leakage energy in a power supply, said apparatus comprising:
   a direct current (DC) input voltage source;
   a transformer having a primary side and a secondary side, the primary side having a primary winding and a primary reference point, the secondary side having a secondary winding and a secondary reference point, the transformer exhibiting leakage inductance characteristics;

a switch coupling the DC input voltage source to the transformer primary winding, the switch alternately connecting the DC input voltage source to the transformer primary winding when the switch is closed and disconnecting the DC input voltage source from the transformer primary winding when the switch is open, the transformer acquiring an inductive leakage energy when the switch is closed and releasing the inductive leakage energy when the switch is open;

a rectifier in communication with the transformer primary side for directing the inductive leakage energy out of the transformer when the switch is open; and a capacitor in communication with the rectifier for receiving, storing, and releasing the inductive leakage energy obtained from the transformer through the rectifier such that the capacitor establishes an average energy source, the rectifier and the capacitor defining a RC circuit.

2. The apparatus of claim 1, further including a load in communication with the RC circuit for utilizing energy released from the average energy source, the load comprising functional circuitry within the power supply.

3. The apparatus of claim 1, wherein the load comprises hold-up capacitors in the power supply.

4. The apparatus of claim 1, wherein the capacitor is connected between the cathode of the rectifier and the primary winding.

5. The apparatus of claim 1, wherein the capacitor is connected between the cathode of the rectifier and the primary reference point.

6. The apparatus of claim 1, wherein the rectifier and the capacitor are physically located substantially near the transformer.

7. The apparatus of claim 1, wherein the load utilizes energy released from the average energy source when the switch is closed, and utilizes energy released from the average energy source plus a portion of the inductive leakage energy from the transformer when the switch is open.

8. The apparatus of claim 1, wherein the capacitor is connected between the cathode of the rectifier and the secondary winding.

9. The apparatus of claim 1, wherein the capacitor is connected between the cathode of the rectifier and the secondary reference point.

10. An apparatus for transferring inductive leakage energy within a power supply to a useful load comprising:

a direct current (DC) input voltage source;

a transformer having a primary winding, a primary reference point, a secondary winding and a secondary reference point, the transformer exhibiting leakage inductance characteristics when operated;

a switch coupling the DC input voltage source to the transformer primary winding, the switch alternately connecting the DC input voltage source to the transformer primary winding when the switch is closed and disconnecting the DC input voltage source from the transformer primary winding when the switch is open, the transformer acquiring an inductive leakage energy when the switch is closed and releasing the inductive leakage energy when the switch is open;

a directing means in communication with the switch to direct the inductive leakage energy out of the transformer when the switch is open;

a storage means in communication with the directing means for receiving, storing, and releasing the inductive leakage energy obtained from the transformer through the directing means such that the storage means establishes; and a load in communication with the storage means, the load receiving energy released from the average energy source.

11. The apparatus of claim 10, wherein the load comprises hold-up capacitors in the power supply.

12. The apparatus of claim 11, wherein the storage means communicates with the cathode of the directing means and the primary winding.

13. The apparatus of claim 12, wherein the functional load utilizes energy released from the average energy source when the switch is closed, and utilizes energy released from the average energy source plus a portion of the inductive leakage energy from the transformer when the switch is open.

14. The apparatus of claim 11, wherein the storage means communicates with the cathode of the directing means and the primary reference point.

15. The apparatus of claim 14, wherein the functional load utilizes energy released from the average energy source when the switch is closed, and utilizes energy released from the average energy source plus a portion of the inductive leakage energy from the transformer when the switch is open.

16. The apparatus of claim 11, wherein the storage means communicates with the cathode of the directing means and the secondary winding.

17. The apparatus of claim 11, wherein the storage means communicates with the cathode of the directing means and the secondary reference point.

18. A method for using inductive leakage energy within a power supply comprising the steps of:

providing a direct current (DC) input voltage source;

coupling a transformer to the DC input voltage source, the transformer exhibiting leakage inductance characteristics;

opening and closing a switch in communication with the DC input voltage source and the transformer primary winding, the transformer acquiring an inductive leakage energy when the switch is closed and releasing the inductive leakage energy when the switch is open;

directing the inductive leakage energy out of the transformer when the switch is open; and receiving, storing, and releasing the inductive leakage energy obtained from the transformer by establishing an average energy source.

19. The method of claim 18, wherein the capacitor communicates with the cathode of the rectifier and the primary winding.

20. The method of claim 18, wherein the capacitor communicates with the cathode of the rectifier and the primary reference point.

21. The apparatus of claim 18, wherein the capacitor communicates with the cathode of the rectifier and the secondary winding.

22. The apparatus of claim 18, wherein the capacitor communicates with the cathode of the rectifier and the secondary reference point.

* * * * *